US012592250B2

(12) United States Patent
Teo et al.

(10) Patent No.: US 12,592,250 B2
(45) Date of Patent: Mar. 31, 2026

(54) SUSPENSION FLEXURE FORMING FOR GIMBALING CLEARANCE

(71) Applicant: Western Digital Technologies, Inc., San Jose, CA (US)

(72) Inventors: Kia Moh Teo, San Jose, CA (US); Hiroyasu Tsuchida, Fujisawa (JP); Yanning Liu, San Jose, CA (US); Haruhide Takahashi, Yokohama (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/419,494

(22) Filed: Jan. 22, 2024

(65) Prior Publication Data
US 2025/0239273 A1      Jul. 24, 2025

(51) Int. Cl.
*G11B 5/48* (2006.01)
*G11B 5/127* (2006.01)

(52) U.S. Cl.
CPC .......... *G11B 5/4833* (2013.01); *G11B 5/1272* (2013.01); *G11B 5/4826* (2013.01)

(58) Field of Classification Search
None
See application file for complete search history.

(56) References Cited

U.S. PATENT DOCUMENTS 5,748,409 A * 5/1998 Girard ................. G11B 5/4826
6,233,121 B1 * 5/2001 Pan ..................... G11B 5/4826

| 7,502,203 | B1 * | 3/2009 | McCaslin ............ G11B 5/4833 |
| | | | 360/244.5 |
| 7,624,610 | B2 | 12/2009 | Inoue et al. |
| 7,675,713 | B2 | 3/2010 | Ogawa et al. |
| 8,537,499 | B2 | 9/2013 | Yamada et al. |
| 11,037,589 | B1 * | 6/2021 | Deokar ............... G11B 5/4826 |
| 11,074,932 | B1 * | 7/2021 | Suzuki .................. G11B 21/12 |
| 11,176,961 | B2 * | 11/2021 | Suzuki ................ G11B 5/4846 |
| 2004/0008449 | A1 * | 1/2004 | Girard ................ G11B 5/4826 |
| 2004/0070883 | A1 * | 4/2004 | Mahoney ............ G11B 5/4833 |
| 2006/0007599 | A1 * | 1/2006 | Shum .................. G11B 5/4833 |
| | | | 360/244.8 |

(Continued)

FOREIGN PATENT DOCUMENTS

| JP | 2004326891 A | * | 11/2004 | .......... G11B 5/4833 |
| JP | 2006085790 A | * | 3/2006 | .......... G11B 5/4826 |

*Primary Examiner* — William J Klimowicz
(74) *Attorney, Agent, or Firm* — John D. Henkhaus

(57) ABSTRACT

A suspension assembly for a hard disk drive includes a load beam coupled with a corresponding flexure via a centerline weld at a distal portion of the flexure, where the flexure further includes a gimbal portion at least in part formed away from the load beam in proximity to the centerline weld. The gimbal portion may be formed away from the load beam by way of mechanical forming prior to welding to the load beam and/or at least lateral portions may be formed away from the load beam by way of laser irradiation to the flexure subsequent to welding to the load beam. In either case, clearance between the pivoting gimbal flexure and the corresponding load beam around the vicinity of the center-line weld attachment point is enabled, to provide freedom from interference between the parts and stable resonance modes throughout the media load z-height variations.

20 Claims, 6 Drawing Sheets

(56)        References Cited

U.S. PATENT DOCUMENTS

| | | | | |
|---|---|---|---|---|
| 2008/0144223 A1* | 6/2008 | Muraki | ................ | G11B 5/4853 |
| | | | | 360/244.8 |
| 2011/0090600 A1* | 4/2011 | Feng | ................... | G11B 5/4833 |
| | | | | 360/245.3 |
| 2014/0022671 A1* | 1/2014 | Takikawa | ............. | G11B 5/4873 |
| | | | | 360/234.6 |
| 2015/0055253 A1* | 2/2015 | Takikawa | ............. | G11B 5/4826 |
| | | | | 360/246.2 |
| 2020/0372930 A1* | 11/2020 | Ee | ........................ | G11B 5/5552 |
| 2021/0225394 A1* | 7/2021 | Suzuki | ...................... | G11B 5/54 |
| 2021/0280209 A1* | 9/2021 | Suzuki | ................ | G11B 5/4846 |
| 2023/0117866 A1* | 4/2023 | Nishida | ............... | G11B 5/4833 |
| | | | | 29/603.03 |
| 2023/0123177 A1* | 4/2023 | Senda | .................. | G11B 5/4833 |
| | | | | 360/244.2 |
| 2023/0290373 A1* | 9/2023 | Takikawa | ............. | G11B 5/4833 |
| 2024/0282334 A1* | 8/2024 | Kamiya | ............... | G11B 5/4826 |

* cited by examiner

100

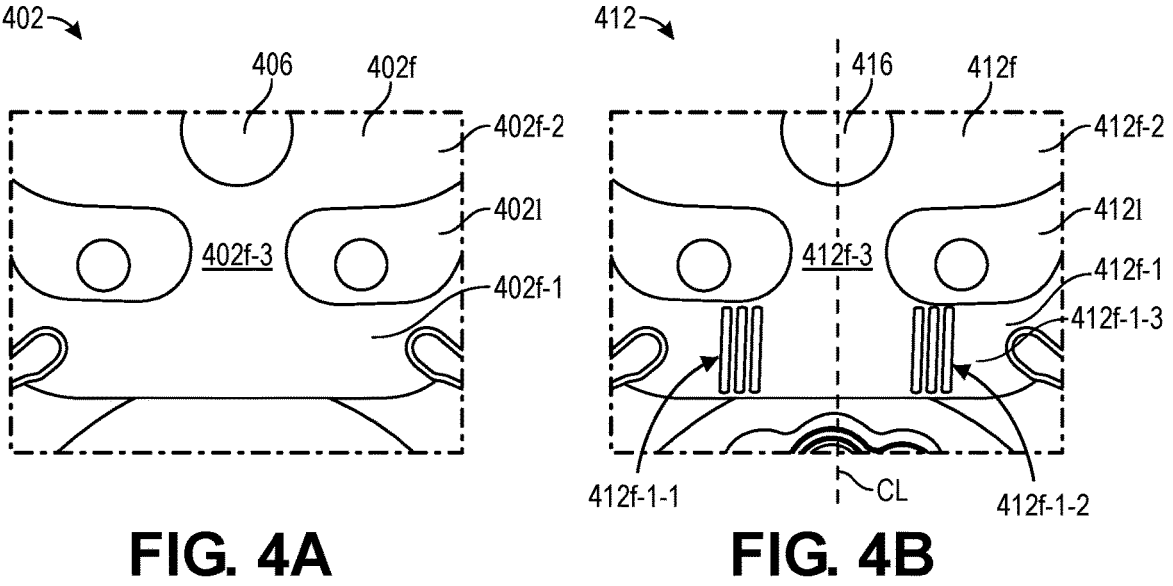
FIG. 4A                    FIG. 4B
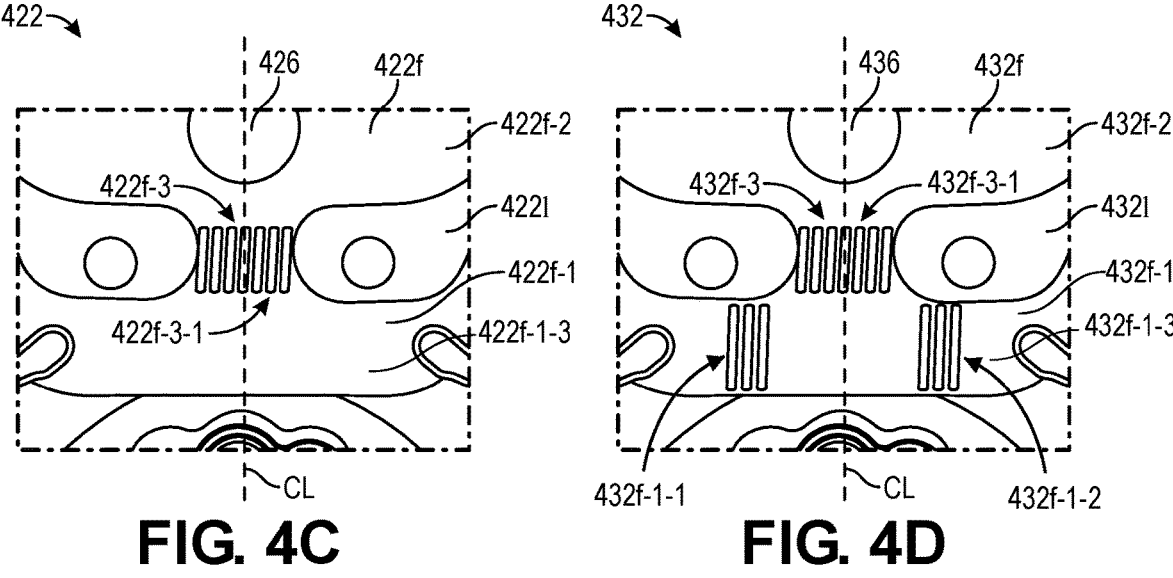
FIG. 4C                    FIG. 4D

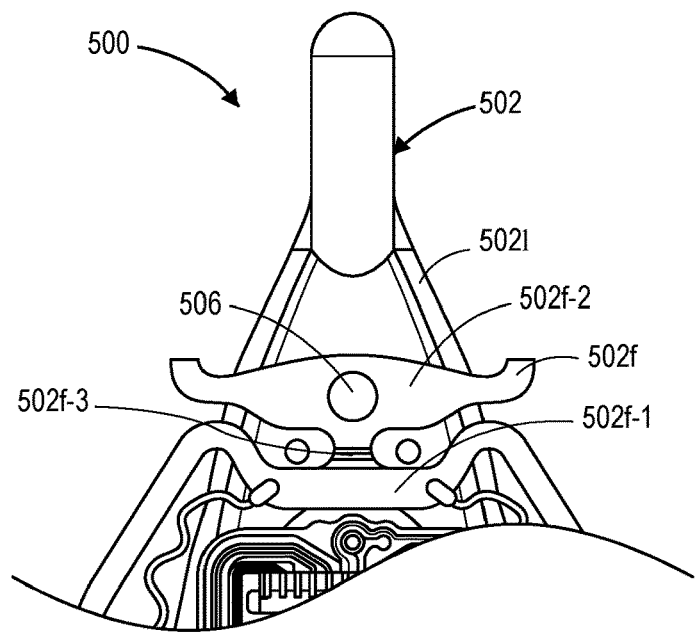
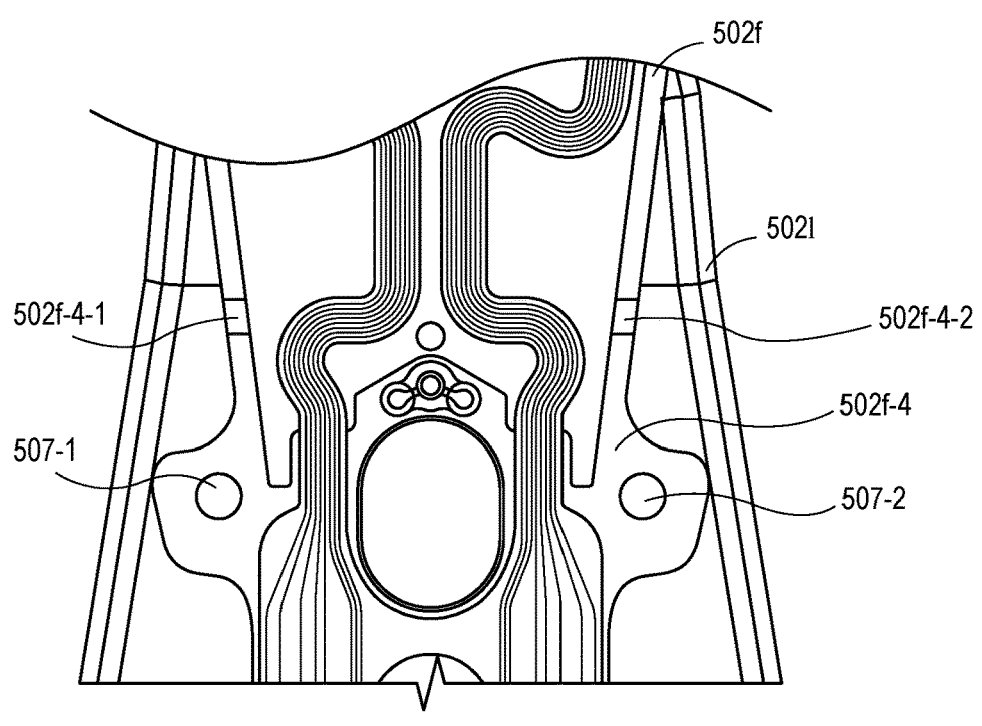
FIG. 5

Figure 6:
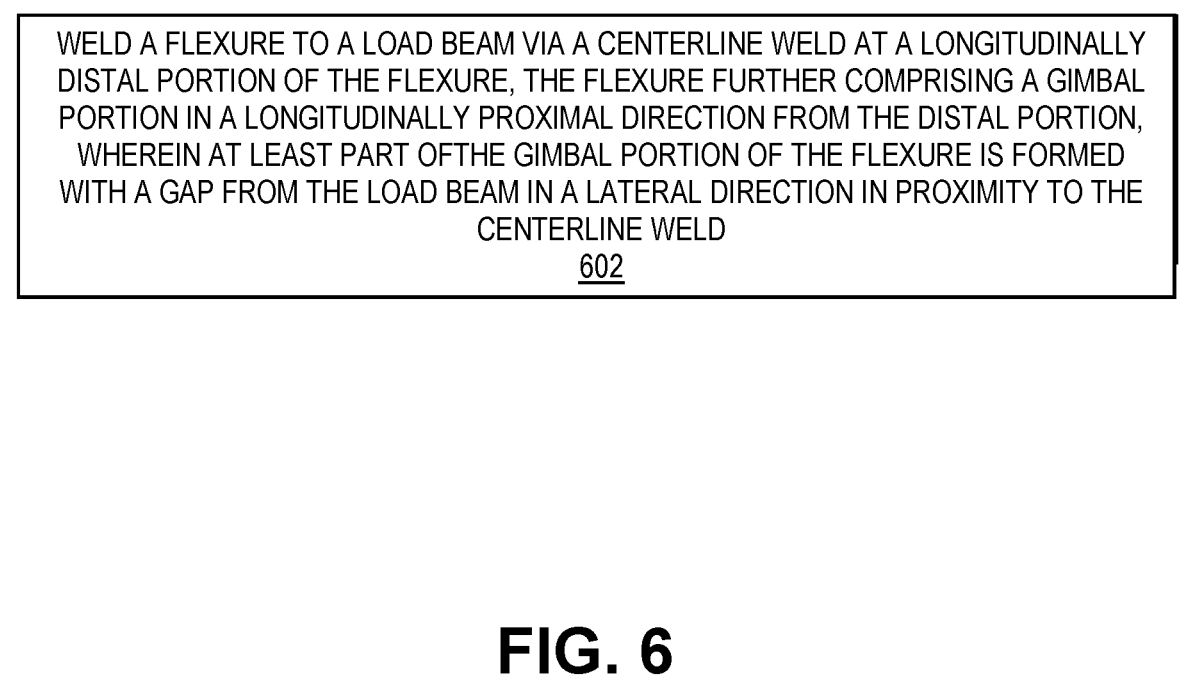

WELD A FLEXURE TO A LOAD BEAM VIA A CENTERLINE WELD AT A LONGITUDINALLY DISTAL PORTION OF THE FLEXURE, THE FLEXURE FURTHER COMPRISING A GIMBAL PORTION IN A LONGITUDINALLY PROXIMAL DIRECTION FROM THE DISTAL PORTION, WHEREIN AT LEAST PART OF THE GIMBAL PORTION OF THE FLEXURE IS FORMED WITH A GAP FROM THE LOAD BEAM IN A LATERAL DIRECTION IN PROXIMITY TO THE CENTERLINE WELD

SUSPENSION FLEXURE FORMING FOR GIMBALING CLEARANCE

FIELD OF EMBODIMENTS

Embodiments of the invention may relate generally to a hard disk drive and particularly to enabling gimbaling clearance between a flexure and a load beam of a suspension assembly.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head (or "transducer") that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

An HDD includes at least one head gimbal assembly (HGA) that generally includes a suspension assembly and a corresponding head slider mounted thereon and which houses the read-write transducer (or "head"). Each slider is attached to the free end of the suspension assembly that is cantilevered from the rigid arm of an actuator. Several actuator arms may be combined to form a single movable unit, a head stack assembly (HSA), typically having a rotary pivotal bearing system. The suspension assembly of a conventional HDD typically includes a relatively stiff load beam with a mount plate at its base end, which attaches to the actuator arm, and whose free end mounts a flexure (or "gimbal" or "gimbal flexure") that carries the slider and its read-write head. Positioned between the mount plate and the functional end of the load beam is effectively a "hinge" that is compliant in the vertical bending direction (normal to the disk surface). The hinge enables the load beam to suspend and load the slider and the read-write head toward the spinning disk surface. It is then the function of the flexure to provide gimbaled support for the slider so that the slider can pitch and roll (i.e., can gimbal) in order to adjust its orientation.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 4A is a top view illustrating a load beam-flexure mechanical interface;

FIG. 4B is a first top view illustrating a load beam-flexure mechanical interface having an irradiated clearance-formed flexure, according to an embodiment;

FIG. 4C is a second top view illustrating a load beam-flexure mechanical interface having an irradiated clearance-formed flexure, according to an embodiment;

FIG. 4D is a third top view illustrating a load beam-flexure mechanical interface having an irradiated clearance-formed flexure, according to an embodiment;

FIG. 5 is a top view illustrating secondary load beam-flexure mechanical interfaces having an irradiated clearance-formed flexure, according to an embodiment; and FIG. 6 is a flow diagram illustrating a method of manufacturing a head gimbal assembly, according to an embodiment.

DETAILED DESCRIPTION

Generally, approaches to a gimbaling clearance-formed flexure of a suspension assembly for a head-gimbal assembly (HGA) for a hard disk drive (HDD) are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment or to every embodiment.

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the structure is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall that it is the function of the flexure to provide gimbaled support for the slider so that the slider can pitch and roll in order to adjust its orientation. However, there is always some variation of the HGA to media load height differences because of mechanical tolerances. For stable suspension resonance modes control, it is highly desirable if not critical that the physical boundary surrounding the gimbal around the weld attachment points is free from any feature interferences or contact. Any physical contact between the pivoting gimbal and the load beam structure surrounding the weld point could cause gimbal resonance mode changes that are not stable for servo control.

Figures 2A, 2B, 2C:
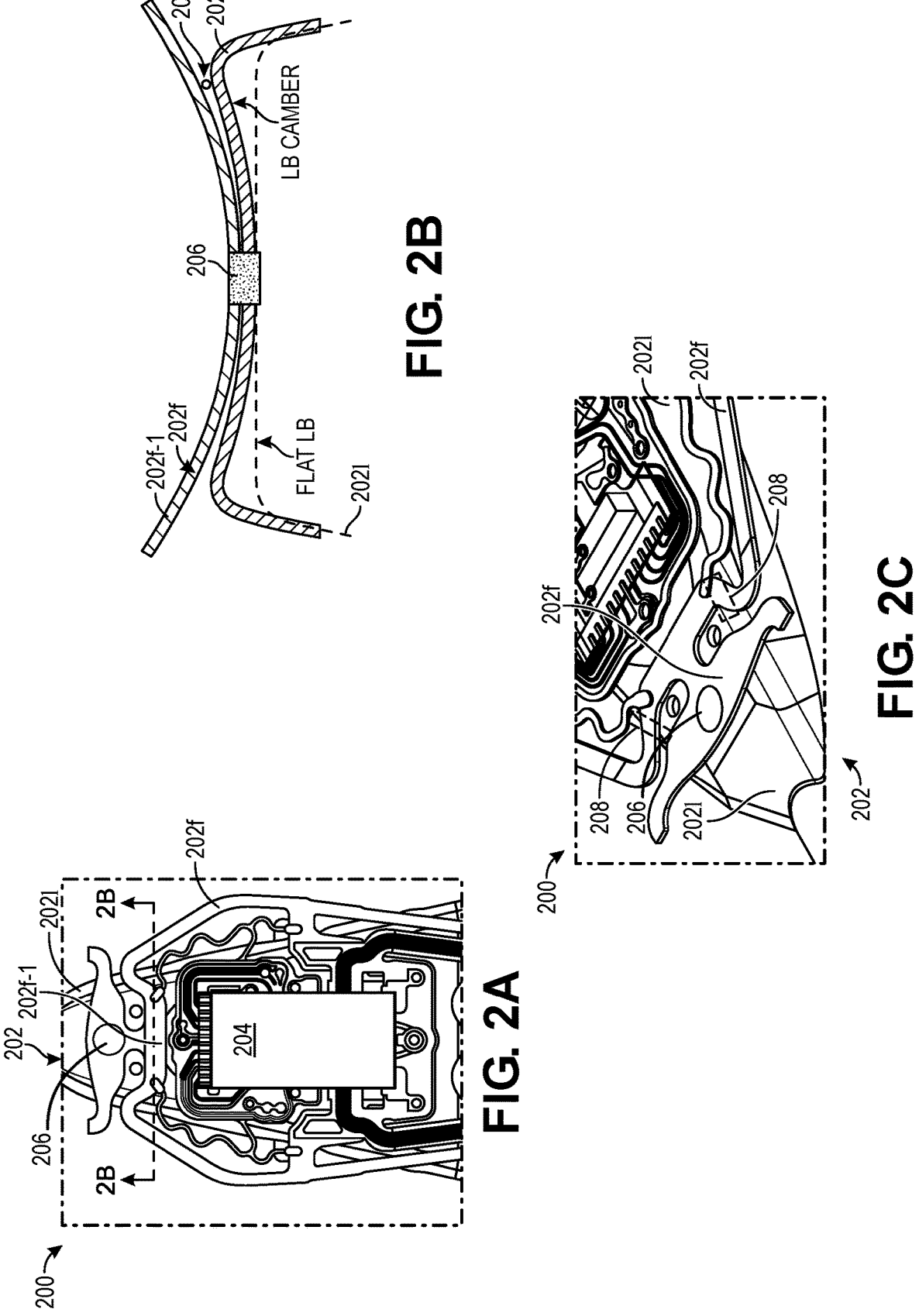
FIG. 2A is a top view illustrating a head gimbal assembly, according to an embodiment.
FIG. 2B is a cross-sectional schematic illustrating the head gimbal assembly of FIG. 2A, according to an embodiment.
FIG. 2C is a perspective view illustrating the head gimbal assembly of FIG. 2A, highlighting areas of potential contact, according to an embodiment.

FIG. 2A is a top view illustrating a head gimbal assembly, FIG. 2B is a cross-sectional schematic illustrating the head gimbal assembly of FIG. 2A, and FIG. 2C is a perspective view illustrating the head gimbal assembly of FIG. 2A, highlighting areas of potential contact. Head gimbal assembly (HGA) 200 comprises a suspension assembly 202 including a flexure 202$f$ movably coupled with a load beam 2021. A slider 204 is mounted on the flexure 202$f$ and, while the flexure 202$f$ is securely coupled with the load beam 2021 via a weld 206, the HGA 200 is designed and configured such that the flexure 202$f$ with slider 204 gimbals (e.g., pitches and rolls) about a dimple (not visible in this view, typically constituent to the load beam 2021).

The cross-sectional view 2B-2B of FIG. 2B depicts an ideally flat load beam such as 2021 ("flat LB" depicted with dashed line), along with a more realistic load beam such as 2021 having a camber condition ("LB camber") whereby the load beam structure tends to deform (here, upward) toward the flexure 202$f$, depicted here with an expected curvature at the flexure T-neck 202$f$-1 location. In view of the foregoing structural arrangement between a load beam 2021 having an LB camber and a flexure T-neck 202$f$-1 having an expected curvature, FIGS. 2B-2C represent generally where contact 208 between the two parts 2021, 202$f$ may likely occur in the vicinity of the T-neck 202$f$-1. Further, FIG. 2B is intended to depict a static situation and thus depicts a small clearance between the parts at contact location 208, while such contact 208 is possibly or likely or actually to occur when the flexure 202$f$ is desirably gimbaling about the load beam 2021 to accurately fly the slider 204 over a disk medium (see, e.g., recording medium 120 of FIG. 1).

As mentioned, within HDDs there is typically some variation of HGA to media load z-height (e.g., in the direction of the disk stack axis/height) differences because of the mechanical tolerances. Flexure 202$f$ to load beam 2021 contact/interference near the trailing end of the suspension assembly 202 (merge lip or lift tab end, depicted in FIGS. 2A-2C) should be expected to and is likely to cause resonance frequency instability when loaded to different z-heights within the mechanical tolerance of an HDD. Any physical contact between the pivoting gimbal flexure 202$f$ and the load beam 2021 structures surrounding and/or in the vicinity of the weld 206 point could cause gimbal resonance mode changes that are not stable for servo control. This instability is caused by a pivoting flexure structure contacting the load beam beyond the weld attachment points, which can happen when the load beam is not formed flat enough to reduce the interference risk. One approach to the foregoing may include employing a narrow-width load beam design, which is not practical for example for a HAMR (heat-assisted magnetic recording) load beam due to a typical laser diode attachment opening in the load beam. Other approaches may involve a wider and thus more costly gimbal flexure, having reduced dynamic performance. In view of the foregoing, designing the gimbal for this pivoting clearance is challenging at least in part because of the underlying load beam width, forming flatness control, and the gimbal dynamic performance requirements. Thus, there remain challenges with the flexure gimbaling/pivoting clearance with the load beam, particularly surrounding the weld attachment points, to provide stable resonance modes throughout the load z-height (e.g., distance of slider to disk medium) variations.

Clearance-Formed Suspension Flexure

According to embodiments, clearance between the pivoting gimbal flexure and the corresponding load beam of a suspension assembly of a head gimbal assembly (HGA) around the vicinity of the centerline weld attachment point is enabled by mechanical flexure forming or localized permanent deformation via laser radiation along the centerline of the flexure part.

Figure 3A:
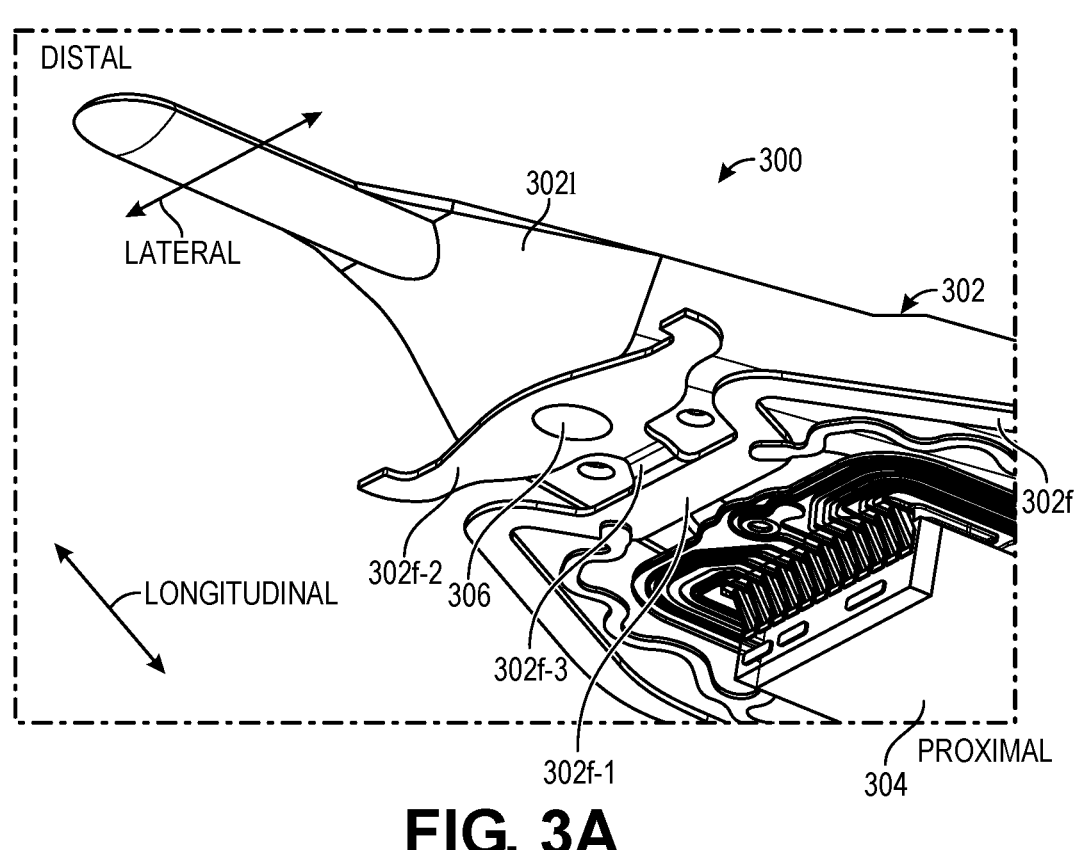
FIG. 3A is a perspective view illustrating a head gimbal assembly having a clearance-formed flexure, according to an embodiment.
Figure 3B:
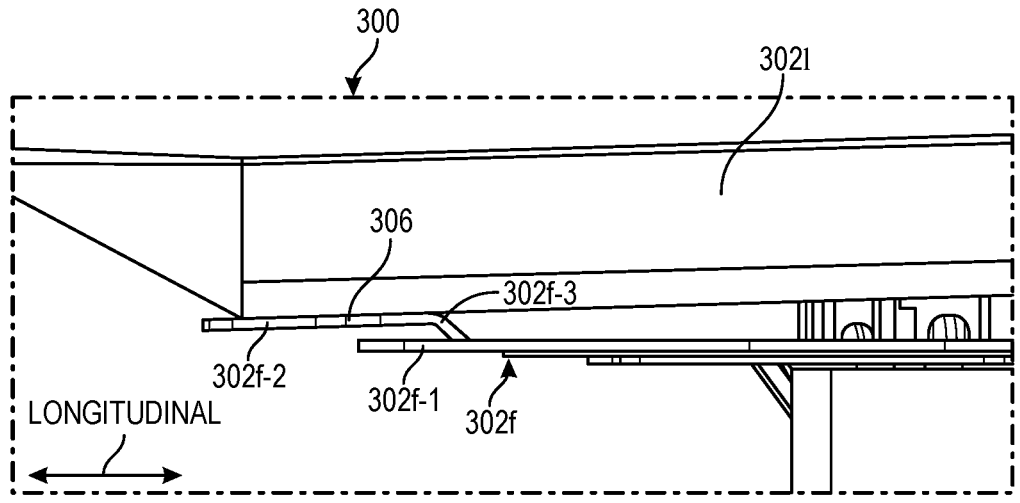
FIG. 3B is a side view illustrating the head gimbal assembly of FIG. 3A, according to an embodiment.

FIG. 3A is a perspective view illustrating a head gimbal assembly having a clearance-formed flexure, and FIG. 3B is a side view illustrating the head gimbal assembly of FIG. 3A, both according to an embodiment. Head gimbal assembly (HGA) 300 comprises a suspension assembly 302 including a flexure 302$f$ movably coupled with a load beam 3021, and further comprising a slider 304 mounted on the flexure 302$f$. Here, flexure 302$f$ is coupled with the load beam 3021 via a centerline weld 306 at a longitudinally distal portion 302$f$-2 of the flexure 302$f$, with the flexure 302$f$ further comprising a gimbal portion 302$f$-1 in a longitudinally proximal direction (e.g., similar to T-neck 202$f$-1 of suspension assembly 200 of FIGS. 2A-2B), wherein the gimbal portion 302$f$-1 of the flexure 302$f$ is formed away or apart from the load beam 3021 in a lateral direction in proximity to the centerline weld 306 (e.g., at areas approximated by contact 208 of FIG. 2C). As such, clearance between the pivoting gimbal flexure 302$f$ and the load beam 3021 structure surrounding, in the vicinity of, in proximity to the weld 306 is provided or enabled to thereby mitigate, reduce, stabilize, eliminate gimbal resonance mode changes that may otherwise occur in instances in which contact or mechanical interference between the pivoting gimbal flexure 302$f$ and the load beam 3021 is not so managed. According to embodiments, a suspension assembly such as suspension assembly 302 is incorporated into an HGA such as HGA 300, which may be incorporated into a hard disk drive (HDD) such as HDD 100 of FIG. 1.

According to an embodiment, the gimbal portion 302$f$-1 of the flexure 302$f$ is formed away or apart from the load beam 3021 in both lateral directions from the centerline weld 306 and at a position in the proximal direction from the centerline weld (see also, e.g., FIGS. 4B-4D). For example and as depicted in FIGS. 3A-3B, the entire gimbal portion 302$f$-1 of the flexure 302$f$ is formed away, apart from the load beam 3021 by way of mechanical forming (e.g., bending), such as at a neck portion 302$f$-3 which connects the distal portion **302*f*-2 and the gimbal portion 302*f*-1 of flexure 302*f*. Here, the neck portion 302*f*-3 may take the form of a "Z" or inclined "L" shape which connects the upper distal portion 302*f*-2, which is welded to the load beam 3021 by weld 306, with the bent away lower gimbal portion 302*f*-1**. This is best envisioned with reference to the side view of FIG. 3B.

FIG. 4A is a top view illustrating a load beam-flexure mechanical interface. Suspension assembly 402 comprises a flexure **402*f* movably coupled with a load beam 4021, whereby the flexure 402*f* is securely coupled with the load beam 4021 via a centerline weld 406. Here, similarly labeled features are similar in location and function to those illustrated and described in reference to FIGS. 3A-3B. For example, flexure 402*f* comprises a gimbal portion 402*f*-1 structurally connected to a distal portion 402*f*-2 via a neck portion 402*f*-3. Suspension assembly 402** of FIG. 4A represents a baseline configuration in which a clearance-formed flexure is not implemented.

According to an embodiment, the flexure is formed away from (i.e., apart from) the load beam by way of laser irradiation to the flexure, rather than by mechanical forming/bending. Judicious positioning/placement of application of laser irradiation to the flexure part heats the flexure material (typically metal) thereby enabling, encouraging, forcing, thermally stressing at least part of the gimbal portion of the flexure to permanently deform in a direction away from the load beam to which the flexure is welded. Generally, and according to an embodiment, the laser irradiation is applied to the flexure about the longitudinal centerline ("CL") of the flexure, which is coincident with the location of the corresponding weld point, thus enabling or producing the foregoing heat-generated permanent deformation of at least a portion (e.g., lateral portions) away or apart from the load beam.

FIG. 4B is a first top view illustrating a load beam-flexure mechanical interface having an irradiated clearance-formed flexure, according to an embodiment. According to this embodiment and as illustrated, laser irradiation is applied to the flexure **412*f* of suspension assembly 412 at multiple target locations substantially equidistant from the centerline of the flexure 412*f*. As depicted, each of multiple groupings of irradiation positions/lines/targets is applied to the gimbal portion 412*f*-1 of the flexure 412*f* in a respective grouping 412*f*-1-1, 412*f*-1-2 on each side of the centerline, in a proximal direction from the distal portion 412*f*-2, the weld 416, and interconnecting neck portion 412*f*-3 of flexure 412*f*. This produces the foregoing heat-generated deformation of at least a portion of the gimbal portion 412*f*-1, such as lateral portion(s) 412*f*-1-3, away from or apart from the load beam 4121**.

FIG. 4C is a second top view illustrating a load beam-flexure mechanical interface having an irradiated clearance-formed flexure, according to an embodiment. According to this embodiment and as illustrated, laser irradiation is applied to the flexure **422*f* of suspension assembly 422 coincident with the centerline of the flexure 422*f*. As depicted, each of multiple irradiation positions/lines/targets is applied to the neck portion 422*f*-3 of the flexure 422*f* in a grouping 422*f*-3-1 generally and substantially at and on each side of the centerline, in a proximal direction from the distal portion 422*f*-2 and the weld 426, and distal from the gimbal portion 422*f*-1 of the flexure 422*f*. This produces the foregoing heat-generated deformation of at least a portion of the gimbal portion 422*f*-1, such as lateral portion(s) 422*f*-1-3, away from or apart from the load beam 4221**.

FIG. 4D is a third top view illustrating a load beam-flexure mechanical interface having an irradiated clearance-formed flexure, according to an embodiment. According to this embodiment and as illustrated, laser irradiation is applied to the flexure **432*f* of suspension assembly 432 coincident with the centerline of the flexure 432*f* and at multiple groupings of target locations substantially equidistant from the centerline of the flexure 432*f*. As such and as depicted, each of a first grouping 432*f*-3-1 of multiple irradiation positions/lines/targets is applied to the neck portion 432*f*-3 of the flexure 432*f* in a grouping generally and substantially at and on each side of the centerline, in a proximal direction from the distal portion 432*f*-2 and the weld 436, and distal from the gimbal portion 432*f*-1 of the flexure 432*f*. Further, and as depicted, each of a second grouping of multiple irradiation positions/lines/targets is applied to the gimbal portion 432*f*-1 of the flexure 432*f* in a respective sub-grouping 432*f*-1-1, 432*f*-1-2 on each side of the centerline, in a proximal direction from the distal portion 432*f*-2, the weld 436, and interconnecting neck portion 432*f*-3 of flexure 432*f*. This produces the foregoing heat-generated deformation of at least a portion of the gimbal portion 432*f*-1, such as lateral portion(s) 432*f*-1-3, away from or apart from the load beam 4321**.

Note that the number of and precise positions of each of the flexure **412*f*, 422*f*, 432*f* irradiation targets (e.g., 412*f*-1-1, 412*f*-1-2, 422*f*-3-1, 432*f*-1-1, 432*f*-1-2, 432*f*-3-1) depicted in each respective FIG. 4B, 4C, 4D are for illustrative purposes and in practice may vary from implementation to implementation, suitable with the goal of deforming the corresponding gimbal portion 412*f*-1, 422*f*-1, 432*f*-1 away or apart from the corresponding load beam 4121, 4221, 4321**.

In the context of a suspension assembly and according to an embodiment, the flexure is coupled with or attached to a corresponding load beam at one or more locations in addition to the distal centerline location depicted elsewhere herein at weld 306 (FIGS. 3A-3B), 406 (FIG. 4A), 416 (FIG. 4B), 426 (FIG. 4C), 436 (FIG. 4D). Thus, the same approach to deforming the flexure part away or apart from the load beam part as described above, to create clearance or additional clearance between the flexure and load beam in the vicinity of the weld to avoid interference/contact between the parts, may be applied to any other flexure-load beam weld attachment locations.

FIG. 5 is a top view illustrating secondary load beam-flexure mechanical interfaces having an irradiated clearance-formed flexure, according to an embodiment. Similarly to suspension assembly 302 of HGA 300 (FIGS. 3A-3B), suspension assembly 412 (FIG. 4B), suspension assembly 422 (FIG. 4C), and suspension assembly 432 (FIG. 4D), suspension assembly 502 of HGA 500 of FIG. 5 comprises a flexure **502*f* movably coupled with a load beam 5021 via a centerline weld 506 at a longitudinally distal portion 502*f*-2 of the flexure 502*f*. Here too the flexure 502*f* further comprises a gimbal portion 502*f*-1 interconnected via a neck portion 502*f*-3 in a longitudinally proximal direction, wherein the gimbal portion 502*f*-1 of the flexure 502*f* may be formed away, apart from the load beam 5021 in a lateral direction in proximity to the centerline weld 506. In the context of suspension assembly 502, the flexure 502*f* is further coupled with the load beam 5021 via a pair of lateral welds 507-1, 507-2 at a longitudinally proximal portion 502*f*-4 of the flexure 502*f*, and the proximal portion 502*f*-4 of the flexure 502*f* is formed away, apart from the load beam 5021 in proximity to, in the vicinity of, near to, adjacent to each of the lateral welds 507-1, 507-2. As such, according to an embodiment laser irradiation is applied to the flexure 502*f*** of suspension assembly 502 at one or more target locations and/or one or more grouping of target locations on the proximal portion 502ƒ-4 of flexure 502ƒ in proximity to the lateral welds 507-1, 507-2. Note that the foregoing target and/or target group locations are distinct from laser irradiation locations 502ƒ-4-1, 502ƒ-4-2 at which irradiation may be applied to the proximal portion 502ƒ-4 to form the flexure 502ƒ for slider static attitude (e.g., pitch static attitude (PSA) and/or roll static attitude (RSA)) purposes, rather than for flexure-to-load beam gimbaling/pivoting clearance.

Method of Manufacturing a Head Gimbal Assembly

FIG. 6 is a flow diagram illustrating a method of manufacturing a head gimbal assembly, according to an embodiment. A head gimbal assembly (HGA) assembled, manufactured, produced according to the method of FIG. 6 is designed, configured, intended for implementation into a hard disk drive (HDD) (see, e.g., HDD 100 of FIG. 1).

At block 602, weld a flexure to a load beam via a centerline weld at a longitudinally distal portion of the flexure, the flexure further comprising a gimbal portion in a longitudinally proximal direction from the distal portion, wherein at least part of the gimbal portion of the flexure is formed with a gap from the load beam in a lateral direction (or both lateral directions, i.e., on each side of the centerline) in proximity to the centerline weld. For example, flexure 302ƒ (FIGS. 3A-3B), 412ƒ (FIG. 4B), 422ƒ (FIG. 4C), 432ƒ (FIG. 4D), 502ƒ (FIG. 5) is welded via centerline weld 306 (FIGS. 3A-3B), 416 (FIG. 4B), 426 (FIG. 4C), 436 (FIG. 4D), 506 (FIG. 5) to load beam 3021 (FIGS. 3A-3B), 4121 (FIG. 4B), 4221 (FIG. 4C), 4321 (FIG. 4D), 5021 (FIG. 5).

As discussed elsewhere herein, mainly in reference to FIGS. 3A-3B, the gimbal portion 302ƒ-1 of the flexure 302ƒ may be formed away, apart from the load beam 3021 by way of mechanical forming (e.g., bending), such as at a neck portion 302ƒ-3 which connects the distal portion 302ƒ-2 and the gimbal portion 302ƒ-1 of flexure 302ƒ, whereby the neck portion 302ƒ-3 may be formed into a "Z" or inclined "L" shape which connects the upper distal portion 302ƒ-2, which is welded to the load beam 3021 by weld 306, with the bent away lower gimbal portion 302ƒ-1. Thus, according to an embodiment, the method of FIG. 6 may further comprise prior to the welding (block 602), mechanically pre-forming the flexure such that the gimbal portion of the flexure bends away from the distal portion of the flexure, and therefore ultimately away from or apart from the load beam upon assembly, at a neck portion of the flexure. For example, flexure 302ƒ, 502ƒ is mechanically pre-formed such that the gimbal portion 302ƒ-1 (FIGS. 3A-3B), 502ƒ-1 (FIG. 5) of the corresponding flexure bends away from the distal portion 302ƒ-2 (FIGS. 3A-3B), 502ƒ-2 (FIG. 5) of the flexure at a neck portion 302ƒ-3 (FIGS. 3A-3B), 502ƒ-3 (FIG. 5) of the flexure.

As discussed elsewhere herein, mainly in reference to FIGS. 4A-4D, at least part of the gimbal portion of the flexure may be formed away or apart from the load beam by way of laser irradiation to the flexure, rather than by (or in addition to) mechanical forming/bending. Thus, according to an embodiment, the method of FIG. 6 may further comprise subsequent to the welding (block 602), forming the flexure by way of laser irradiation to the flexure such that lateral portions of the gimbal portion of the flexure are gapped away from the load beam. For example, lateral portions 412ƒ-1-3 (FIG. 4B), 422ƒ-1-3 (FIG. 4C), 432ƒ-1-3 (FIG. 4D) of the gimbal portion 412ƒ-1 (FIG. 4B), 422ƒ-1 (FIG. 4C), 432ƒ-1 (FIG. 4D), 502ƒ-1 (FIG. 5) of the flexure 412ƒ, 422ƒ, 432ƒ, 502ƒ may be formed away, apart from the load beam 4121 (FIG. 4B), 4221 (FIG. 4C), 4321 (FIG. 4D),

5021 (FIG. 5) by way of laser irradiation to the flexure rather than by mechanical forming/bending, whereby judicious positioning/placement of application of laser irradiation to the flexure part heats the flexure material thereby permanently deforming the gimbal portion of the flexure in a direction away from the load beam thereby creating clearance. Thus, forming the flexure with this approach may include (i) applying the laser irradiation to a group of multiple adjacent irradiation targets comprising targets on each side of the centerline of the flexure (see, e.g., FIG. 4B-4D), and/or (ii) applying the laser irradiation to a group of multiple irradiation targets comprising targets on the gimbal portion substantially equidistant from the centerline of the flexure (see, e.g., FIG. 4B, 4D).

In view of the embodiments described herein, clearance between the pivoting gimbal flexure and the corresponding load beam of a suspension assembly of a head gimbal assembly (HGA) around the vicinity of the centerline weld attachment point is enabled by mechanical flexure forming or localized permanent deformation via laser radiation at least along the centerline of the flexure part. Consequently, freedom from interference by way of the clearance between the parts is provided, thereby enabling stable suspension resonance modes frequencies throughout the anticipated load z-height variations.

Physical Description of an Illustrative Operating Context

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD typically operates.

Figure 1:
FIG. 1 is a plan view illustrating a hard disk drive, according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110*a*, are transmitted by a flexible cable assembly (FCA) 156 (or "flex cable", or "flexible printed circuit" (FPC)). Interconnection between the flex cable 156 and the head 110*a* may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110*a* of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110*b* rides so that the slider 110*b* flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110*b* rides.

The electrical signal provided to the voice coil 140 of the VCM enables the head 110*a* of the HGA 110 to access a track 176 on which information is recorded. Thus, the armature 136 of the VCM swings through an arc 180, which enables the head 110*a* of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110*a* of the HGA 110 reads the servo-burst-signal pattern, which provides a position-error-signal (PES) to the servo electronics, which controls the electrical signal provided to the voice coil 140 of the VCM, thereby enabling the head 110*a* to follow the track 176. Upon finding the track 176 and identifying a particular sectored track portion 188, the head 110*a* either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168. According to an embodiment, the electronic components include a NAND flash memory 190 component or circuitry. NAND flash memory 190 may be configured to store multiple bits within a single NAND cell. Single-level Cell (SLC) stores one bit/cell, while Triple-level Cell (TLC) can store 3 bits/cell. SLC offers higher performance, higher program-erase (P/E) cycles and higher data retention margins compared to TLC, which enables 3× storage in the same footprint as SLC. Application of this NAND technology can enable both SLC for write-heavy operations and TLC and above for read-heavy operations in the same device.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A hard disk drive (HDD) suspension assembly comprising:

a load beam; and a flexure coupled with the load beam via a centerline weld at a longitudinally distal portion of the flexure, the flexure further comprising a gimbal portion connected with the distal portion via a neck portion and in a longitudinally proximal direction from the distal portion, wherein at the neck portion at least part of the gimbal portion of the flexure is permanently deformed vertically away from the load beam at a location proximally adjacent the neck portion and lateral relative to the centerline weld and at which the at least part of the gimbal portion overlaps with the load beam.

2. The HDD suspension assembly of claim 1, wherein the at least part of the gimbal portion of the flexure is permanently deformed vertically away from the load beam at respective lateral locations at both sides relative to the centerline weld and distal from most-laterally extending portions of the gimbal portion.

3. The HDD suspension assembly of claim 1, wherein the entire gimbal portion of the flexure is permanently deformed vertically away from the load beam by way of mechanical forming at the neck portion that connects the distal and the gimbal portions of the flexure.

4. The HDD suspension assembly of claim 1, wherein the at least part of the gimbal portion of the flexure is permanently deformed away from the load beam by way of laser irradiation to the flexure.

5. The HDD suspension assembly of claim 4, wherein the laser irradiation is applied to the flexure coincident with a centerline of the flexure.

6. The HDD suspension assembly of claim 5, wherein the laser irradiation is further applied to the flexure at multiple locations substantially equidistant from the centerline of the flexure.

7. The HDD suspension assembly of claim 4, wherein the laser irradiation is applied to the flexure at multiple locations substantially equidistant from a centerline of the flexure.

8. The HDD suspension assembly of claim 1, wherein:

the flexure is further coupled with the load beam via a pair of lateral welds at a longitudinally proximal portion of the flexure; and the proximal portion of the flexure is formed away from the load beam in proximity to each of the lateral welds.

9. A head gimbal assembly (HGA) comprising the HDD suspension assembly of claim 1.

10. A hard disk drive comprising the HDD suspension assembly of claim 1.

11. A hard disk drive (HDD) comprising:

recording disk media rotatably mounted on a spindle;

a head slider housing a read-write transducer configured to read from and to write to a recording disk medium of the recording disk media;

means for moving the head slider to access portions of the recording disk medium; and a head gimbal assembly (HGA) coupled with the means for moving, the HGA comprising:

a load beam; and a flexure coupled with the load beam via a centerline weld at a longitudinally distal portion of the flexure, the flexure further comprising a gimbal portion connected with the distal portion via a neck portion and in a longitudinally proximal direction from the distal portion, wherein at the neck portion at least part of the gimbal portion of the flexure is permanently deformed vertically apart from the load beam at a location proximally adjacent the neck portion and lateral relative to the centerline weld and at which the at least part of the gimbal portion overlaps with the load beam.

12. The HDD of claim 11, wherein the at least part of the gimbal portion of the flexure is permanently deformed vertically away from the load beam at respective lateral locations at both sides relative to the centerline weld and distal from most-laterally extending portions of the gimbal portion.

13. The HDD of claim 11, wherein:

the flexure is further coupled with the load beam via a pair of lateral welds at a longitudinally proximal portion of the flexure; and the proximal portion of the flexure is formed away from the load beam in proximity to each of the lateral welds.

14. A method of manufacturing a head gimbal assembly (HGA), the method comprising:

welding a flexure to a load beam via a centerline weld at a longitudinally distal portion of the flexure, the flexure further comprising a gimbal portion connected with the distal portion via a neck portion and in a longitudinally proximal direction from the distal portion, wherein at the neck portion at least part of the gimbal portion of the flexure is permanently deformed with a vertical gap from the load beam at a location proximally adjacent the neck portion and lateral relative to the centerline weld and at which the at least part of the gimbal portion overlaps with the load beam.

15. The method of claim 14, wherein the at least part of the gimbal portion of the flexure is formed vertically away from the load beam at respective lateral locations at both sides relative to the centerline weld and distal from most-laterally extending portions of the gimbal portion.

16. The method of claim 14, further comprising:

prior to the welding, mechanically pre-forming the flexure such that the gimbal portion of the flexure bends away from the distal portion of the flexure at the neck portion of the flexure.

17. The method of claim 14, further comprising:

subsequent to the welding, forming the flexure by way of laser irradiation to the flexure such that lateral portions of the gimbal portion of the flexure are gapped away from the load beam.

18. The method of claim 17, wherein forming the flexure includes applying the laser irradiation to a group of multiple adjacent irradiation targets comprising targets on each side of a centerline of the flexure.

19. The method of claim 18, wherein forming the flexure further includes applying the laser irradiation to a second group of multiple irradiation targets comprising targets on the gimbal portion substantially equidistant from the centerline of the flexure.

20. The method of claim 17, wherein forming the flexure includes applying the laser irradiation to a group of multiple irradiation targets comprising targets on the gimbal portion substantially equidistant from a centerline of the flexure.

* * * * *